(12) United States Patent
Matsuoka

(10) Patent No.: US 7,460,193 B2
(45) Date of Patent: Dec. 2, 2008

(54) FLAT PANEL DISPLAY HAVING SENSOR BOARD AND CIRCUIT BOARD ATTACHED TO FRAME VIA SCREWS

(75) Inventor: Takaharu Matsuoka, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 432 days.

(21) Appl. No.: 11/062,878

(22) Filed: Feb. 23, 2005

(65) Prior Publication Data

US 2005/0185111 A1    Aug. 25, 2005

(30) Foreign Application Priority Data

Feb. 25, 2004    (JP) .............................. 2004-050246

(51) Int. Cl.
*G02F 1/1333* (2006.01)
(52) U.S. Cl. ........................................................ 349/58
(58) Field of Classification Search .................... 349/58
See application file for complete search history.

(56) References Cited

U.S. PATENT DOCUMENTS

| 2004/0042160 A1* | 3/2004 | Yang et al. ................. 361/681 |
| 2004/0046906 A1* | 3/2004 | Lee ............................... 349/58 |
| 2004/0125312 A1* | 7/2004 | You et al. ................... 349/149 |
| 2004/0189887 A1* | 9/2004 | You et al. ...................... 349/58 |
| 2005/0062902 A1* | 3/2005 | Fukayama .................... 349/58 |

FOREIGN PATENT DOCUMENTS

| CN | 1512223 A | 7/2004 |
| JP | 10-63419 | 3/1998 |
| JP | 2002-107697 | 4/2002 |
| JP | 2004-212973 | 7/2004 |

\* cited by examiner

*Primary Examiner*—David C. Nelms
*Assistant Examiner*—Nathanael R Briggs
(74) *Attorney, Agent, or Firm*—Oblon, Spivak, McClelland, Maier & Neustadt, P.C.

(57) ABSTRACT

A flat-panel display apparatus, to which a sensor board can be easily attached, is provided. In the flat-panel display apparatus, a driver circuit is attached to a side portion of a liquid crystal panel via a flexible print circuit. The liquid crystal panel is attached to the main surface of a frame. The flexible print circuit is bent toward the back surface of the frame. The driver circuit is attached to the back surface of the frame with a space therebetween. A digitizer board is inserted into the space between the driver circuit and the frame. Thus, the digitizer board can be easily attached to the back surface of the frame.

2 Claims, 2 Drawing Sheets

FLAT PANEL DISPLAY HAVING SENSOR BOARD AND CIRCUIT BOARD ATTACHED TO FRAME VIA SCREWS

CROSS-REFERENCE TO RELATED APPLICATIONS

This application is based upon and claims the benefit of priority from prior Japanese Patent Application No. 2004-050246, filed Feb. 25, 2004, the entire contents of which are incorporated herein by reference.

BACKGROUND OF THE INVENTION

1. Field of the Invention

The present invention relates to a flat-panel display apparatus having a sensor board and a method for manufacturing the same.

2. Description of the Related Art

In recent years, owing to the fast growth of communication infrastructures, such as mobile phone systems, a lifestyle has widely spread, in which information is exchanged between mobile units outdoors. Under the circumstances, mobile computing, utilizing tablet personal computers, has attracted the public attention.

Further, technologies for upsizing and finer resolution of a liquid crystal display apparatus, and reduction in power consumption, size and weight of a notebook-sized personal computer, have remarkably progressed. The progress accelerates the development of mobile computing.

The conventional liquid crystal display apparatus for use in this type of tablet personal computer has a liquid crystal panel as a flat display panel. A backlight as a planar light source is attached to face the back surface of the liquid crystal panel. The backlight and the liquid crystal panel are held in a frame of the apparatus.

The liquid crystal display apparatus has a digitizer board as a sensor board to be incorporated on the back surface side of the liquid crystal panel. It is known that the digitizer board is attached to the back surface of a backlight in the liquid crystal panel by a double-faced adhesive tape or to the periphery of the frame by caulking (see, for example, Jpn. Pat. Appln. KOKAI Publication No. 10-63419, pages 2 and 3 and FIGS. 2 and 3).

In the conventional liquid crystal display apparatus, to incorporate the digitizer board into the back side portion of the liquid crystal panel, the digitizer board is fixed to the frame by caulking or adhered to the back surface of the backlight by a double-sided adhesive tape. Thus, the process of incorporating the digitizer board into the back side portion of the liquid crystal panel is complicated. Therefore, the conventional art has the problem that it is difficult to attach the digitizer board to the liquid crystal panel.

BRIEF SUMMARY OF THE INVENTION

The present invention has been made in consideration of the above circumstances, and its object is to provide a flat-panel display apparatus, to which the sensor board can be easily attached.

A flat-panel display apparatus, according to an aspect of the present invention, comprises:

a flat display panel;

a circuit board, which is disposed to face the flat display panel with a space therebetween, and electrically connected to the flat display panel; and a sensor board, which is inserted and disposed in the space between the circuit board and the flat display panel and senses an input through the flat display panel.

A method for manufacturing a flat-panel display apparatus, according to a second aspect of the present invention, comprises:

disposing a circuit board electrically connected to a flat display panel to face the flat display panel with a space therebetween; and sliding and inserting the sensor board into the space.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiments given below, serve to explain the principles of the invention.

DETAILED DESCRIPTION OF THE INVENTION

An embodiment of a flat-panel display apparatus of the present invention and a method for manufacturing the same will be described with reference to FIGS. 1 to 3.

Figure 1:
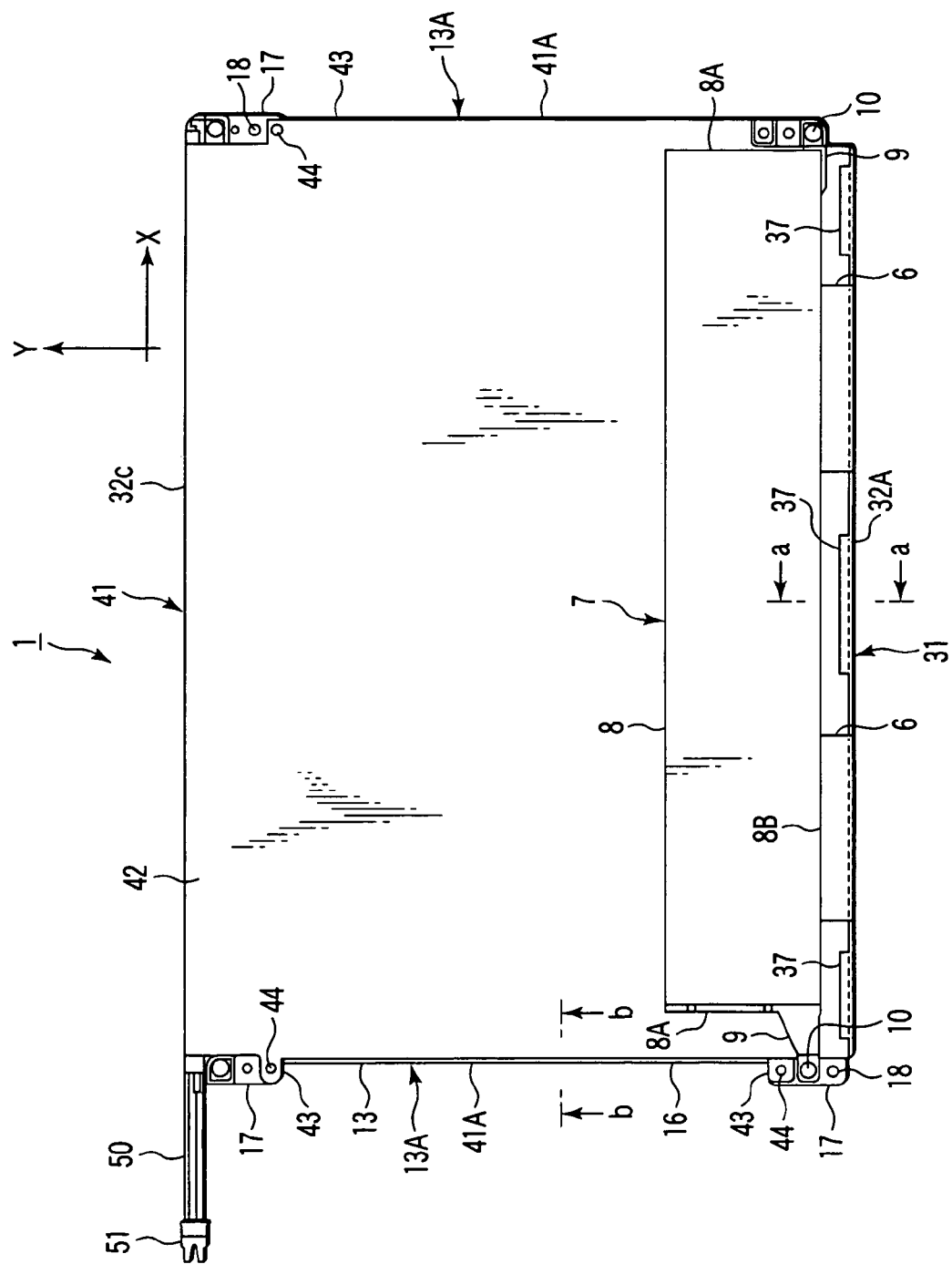
FIG. 1 is a plan view showing a flat-panel display apparatus according to an embodiment of the present invention.
Figure 2:
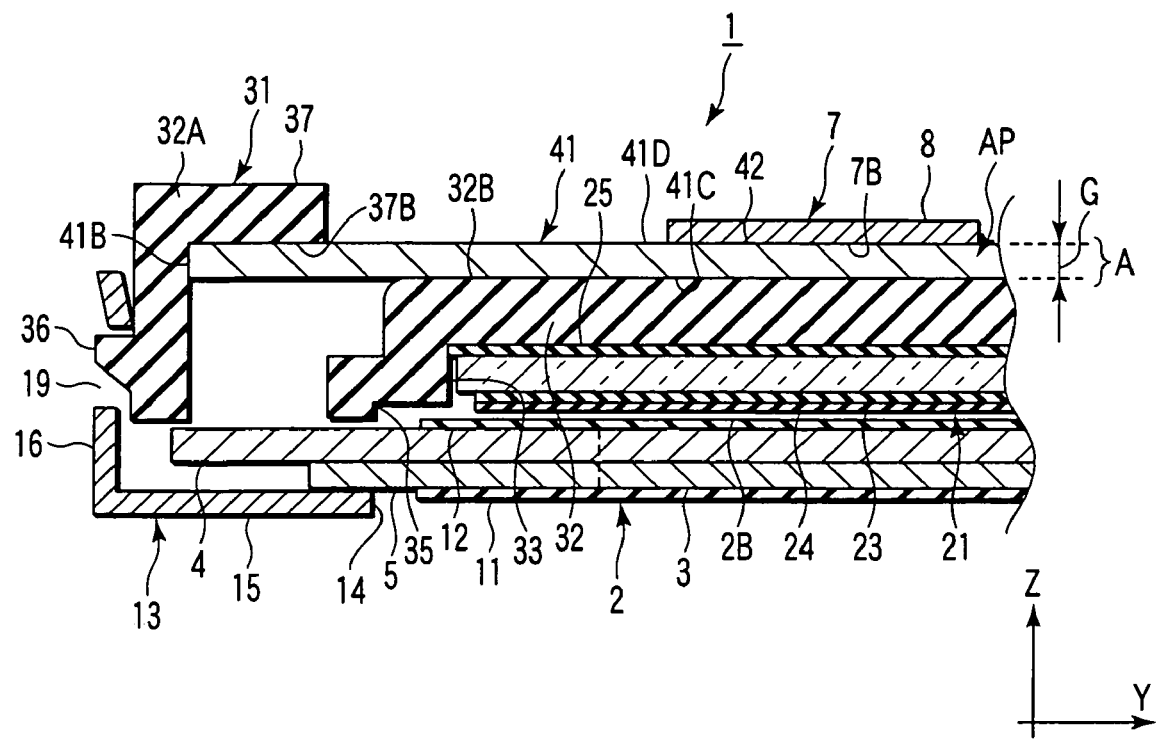
FIG. 2 is a cross-sectional view taken along the line a-a in FIG. 1.
Figure 3:
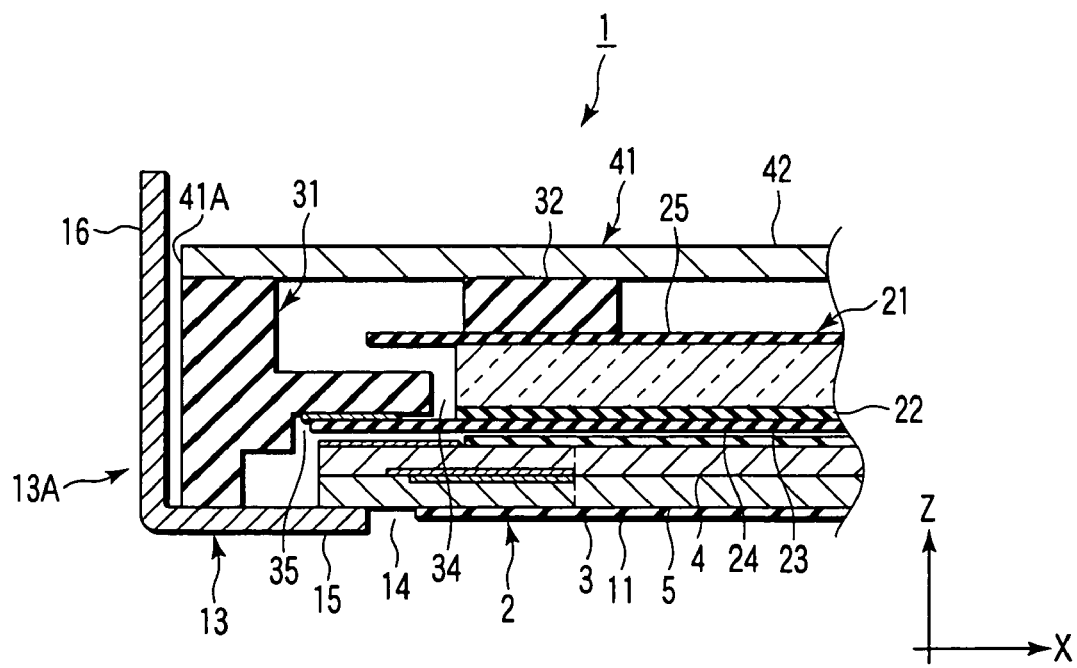
FIG. 3 is a cross-sectional view taken along the line b-b in FIG. 1.

In FIGS. 1 to 3, a liquid crystal display apparatus 1 as a flat-panel display apparatus is a thin portable liquid crystal display of input/output integral type, which is relatively large, has a narrow frame. The liquid crystal display apparatus 1 has a transparent, substantially rectangular flat liquid crystal panel 2 mainly for use in an image display portion of a notebook-sized personal computer (PC).

In the following descriptions, the direction along the long side of the liquid crystal display apparatus is designated as an X direction, the direction along the short side thereof is designated as a Y direction and the thickness direction thereof is designated as a Z direction.

The liquid crystal panel 2 is a flat display panel of light transmission type, which allows color display, and includes an optical modulation layer comprising a liquid crystal. The liquid crystal panel 2 has a rectangular display screen area 3 as an effective display area, which displays images. The display screen area 3 is formed of a plurality of display pixels (not shown), which are arranged in a matrix.

The liquid crystal panel 2 has an array substrate 4 and a counter substrate 5. The array substrate 4 includes a plurality of scanning lines extending along a row direction (X direction) of the display pixels and a plurality of signal lines extending along a column direction (Y direction) of the display pixels. The array substrate 4 further includes thin film transistors (TFTs) (not shown), which are arranged in a matrix on the main surface. The counter substrate 5 is arranged to face the main surface of the array substrate 4. The counter substrate 5 includes a counter electrode (not shown)

on the back surface thereof. One side of the counter substrate 5 is located in an inner portion from one end of the array substrate 4. A liquid crystal layer is inserted and sealed between the array substrate 4 and the counter substrate 5.

A plurality of, for example, two flexible print circuits (FPCs) 6 are electrically connected, at their first ends, to a surface of the lower end portion of the array substrate 4 in a side end portion of the liquid crystal panel 2 (the portion which extends outward from the counter substrate 5). Each of the flexible print circuits 6 has a flat elongated rectangular shape. The flexible print circuits 6 are driving integrated circuits, and attached to the lower end portion of the array substrate 4 at a predetermined distance therebetween.

A driver circuit 7, which has a flat elongated rectangular shape, is connected to second ends of the flexible print circuits 6. The driver circuit 7 is, for example, a scanning line driving circuit. One side of the driver circuit 7, extending in the width direction thereof (X direction), is connected to the flexible print circuits 6. Thus, the driver circuit 7 is electrically connected to the array substrate 4 via the flexible print circuits 6.

The driver circuit 7 supplies a control signal to the flexible print circuits 6. The flexible print circuit 6 supplies a drive signal from the driver circuit 7 to the scanning lines or signal lines (not shown) of the liquid crystal panel 2. As a result, the liquid crystal panel 2 is driven and images are displayed on the display screen area 3 of the liquid crystal panel 2.

The driver circuit 7 comprises a circuit body 8, which has a flat elongated rectangular shape. As shown in FIG. 1, a connection piece 9 is integrally projected from each of end portions 8A at both ends in the longitudinal direction (X direction) of the circuit body 8. The connection pieces 9 are flush with the main surface (the plane defined by the X and Y directions) of the circuit body 8. An end of each projection piece 9 is aligned with one side 8B of the circuit body 8, to which the flexible print circuits 6 are connected. Further, each connection piece 9 has a screw insertion hole 10, extending in the thickness direction of the connection piece 9.

Rectangular flat polarizing plates 11 and 12, as optical sheets, are attached to the main and back surfaces of the display screen area 3 of the liquid crystal panel 2. The polarizing plates 11 and 12 optically changes light incident on or emitted from the display screen area 3.

A rectangular frame-shaped bezel cover 13 is attached to the main surface side of the liquid crystal panel 2. The bezel cover 13 has a rectangular frame-shaped body portion 15. A rectangular window portion 14 is opened in a central portion of the body portion 15. The window portion 14 exposes the display screen area 3 of the liquid crystal panel 2. The window portion 14 has a shape corresponding to the display screen area 3.

The body portion 15 has an elongated flat peripheral portion 16, serving as an engaging portion, which covers the periphery of the liquid crystal panel 2 contained in a back side portion of the body portion 15. The peripheral portion 16 is formed integral with the periphery of the body portion 15 along the circumferential direction, and projects from the body portion 15 along the thickness direction (Z direction) of the liquid crystal display apparatus 1.

The bezel cover 13 has side portions 13A at both ends thereof in the width direction (X direction). Flat attachment portions 17, which are substantially rectangular, are provided on the peripheral portion 16 at each of the side portions 13A. The attachment portions 17 are shaped like an ear, which protrude from the peripheral portion 16 at right angles. The attachment portions 17 are formed at both ends in the height direction (Y direction) of each side portion 13A. Each of the attachment portions 17 is substantially parallel to the body portion 15 of the bezel cover 13 and integral with an edge of the peripheral portion 16.

The attachment portion 17 has a plurality of, for example, three screw holes 18 extending in the thickness direction (Z direction) of the attachment portion 17. The screw holes 18 are apart from each other substantially at regular intervals along the longitudinal direction (Y direction) of the attachment portion 17. One of the screw holes 18 communicates with the screw insertion hole 10 of the driver circuit 7, so that the driver circuit 7 can be screwed into the bezel cover 13, when the driver circuit 7 is arranged to face the back side of the bezel cover 13.

Further, an engaging groove 19 is formed in the peripheral portion 16, which is located at a lower end of the bezel cover 13 along the height direction thereof (Y direction). The engaging groove 19 extends in the longitudinal direction of the peripheral portion 16 (X direction), and has a predetermined width in the width direction of the peripheral portion 16 (Z direction).

A rectangular flat backlight 21, as a planer light source, is attached to face the back side of the liquid crystal panel 2. The backlight 21 emits light toward the display screen area 3 of the liquid crystal panel 2. The backlight 21 has a cold cathode tube (not shown), as an elongated cylindrical light source, and a light guide plate 22 which directs the light incident from the cold cathode tube toward the liquid crystal panel 2. Lamp holders (not shown) for holding the cold cathode tube are attached to the end portions in the longitudinal direction thereof. The cold cathode tube is covered with a lamp reflector (not shown) as a sheet-like reflector, which is curved substantially like a U-shape in the circumferential direction.

The light guide plate 22 is a substantially rectangular flat plate. It has a light incidence surface, on which the incident light from the cold cathode tube is incident, and a light emission surface, which emits the light incident from the cold cathode tube toward the liquid crystal panel 2. The light guide plate 22 is arranged such that the light incidence surface is parallel to the axial direction of the cold cathode tube, and the light emission surface faces the liquid crystal panel 2. The light guide plate 22 is, for example, a prism light guide body made of resin.

The light guide plate 22 deflects the light, which has been emitted from the cold cathode tube and incident on the light incidence surface, toward the light emission surface of the light guide plate 22.

The light guide plate 22 emits the deflected light toward the back surface of the display screen area 3 of the liquid crystal panel 2. The lamp reflector reflects the light emitted from the cold cathode tube, so that the light can be efficiently incident on the light incidence surface of the light guide plate 22.

A plurality of, for example, two substantially rectangular optical sheets 23 and 24, which are overlaid with each other, are arranged to face the light emission surface of the light guide plate 22.

The optical sheets 23 and 24 provide optical characteristics (e.g., the light-gathering property and diffusing property) to the light emitted from the light emission surface of the light guide plate 22, so that the luminance of the emission light can be increased and uniform.

A reflection sheet 25, i.e., a substantially rectangular optical sheet, is attached to the back surface opposite to the light emission surface of the light guide plate 22. The reflection sheet 25 reflects the light, which leaks out through the back surface of the light guide plate 22, toward the light emission surface of the light guide plate 22.

In the backlight 21, the optical sheets 23 and 24 are attached to the light emission surface of the light guide plate 22, the reflection sheet 25 is attached to the back surface of the light guide plate 22, and the cold cathode tube and the lamp reflector are attached to the light incident surface of the light guide plate 22. The backlight 21 thus constructed is held on the main surface side of a substantially rectangular flat frame 31.

The frame 31 has a substantially rectangular frame body 32. The body 32 has, in its central portion on the main surface, a holding recess 33, into which the backlight 21 is fitted. A rectangular opening 34 is provided in a central portion of the holding recess 33. The opening 34 is formed through the body 32 in the thickness direction (Z direction) and exposes the display screen area 3 of the liquid crystal panel 2.

As shown in FIGS. 2 and 3, a holding step portion 35 for holding the peripheral edge of the liquid crystal panel 2 is formed around the peripheral portion of the holding recess 33 of the body 32. The holding step portion 35 has a height substantially the same as the thickness of the liquid crystal panel 2.

The frame 31 holds the backlight 21 in the holding recess 33, and the liquid crystal panel 2 in the holding step portion 35. In this state, the frame 31 is held inside the bezel cover 13. As shown in FIG. 2, an engaging claw portion 36 protrudes outward from the outer side of the lower end of the body 32 at right angles with respect to the outer surface. The engaging claw portion 36 is formed integral with the body 32.

The engaging claw portion 36 is located in an outer peripheral portion of the body 32, and extends in the width direction of the body 32 (X direction). The engaging claw portion 36 engages with the engaging groove 19 of the bezel cover 13, when the frame 31 is held in the bezel cover 13. Thus, the bezel cover 13 is positioned and fixed to the frame 31.

Further, as shown in FIG. 2, an elongated flat holding piece portion 37, as an edge portion, is formed integral with a lower end portion 32A of the body 32. The holding piece portion 37 protrudes from the lower end portion 32A toward the inner portion of the body 32 at right angles with respect to the lower end portion 32A, with a space A of a predetermined width G between the holding piece portion 37 and the back surface 32B of the body 32. In other words, the holding piece portion 37 protrudes along the back surface 32B of the body 32 and forms a substantially U-shaped cross section in the lower end portion 32A of the body 32.

Thus, the space A is formed like a slit between the back surface 32B of the body 32 and an inner surface 37B of the holding piece portion 37 along the width direction (X direction) of the body 32. In other words, the back surface 32B of the body 32 and the inner surface 37B of the holding piece portion 37 are located parallel to each other, forming the space A therebetween.

As shown in FIG. 1, holding piece portions 37 are formed in a central portion of the lower end portion 32A of the body 32 along the longitudinal direction thereof (X direction), and two other portions thereof separated from the central portion. The holding piece portions 37 are provided so as not to overlap the flexible print circuits 6.

A substantially rectangular flat digitizer board 41, as a sensor board, is formed to face the back surface 32B of the body 32 of the frame 31. The digitizer board 41 senses an input through the liquid crystal panel 2. Thus, the digitizer 41 causes the liquid crystal display apparatus 1 of input/output integral type to be operable. More specifically, when, for example, the user or an input pen touches any position on the display screen area 3, the digitizer board 41 senses a change in static capacitance as coordinates, thereby detecting the position which the user or the like touches on the display screen area 3.

The digitizer 41 is held in the space A formed between the driver circuit 7 and the frame 31. An end, i.e., the lower end 41B of the digitizer board 41 in the height direction thereof (Y direction) is engaged and held in the space A formed between the back surface of the body 32 and the inner surface 37B of each of the holding piece portions 37. Thus, the holding piece portions 37 serve as positioning means for positioning the digitizer board 41 with respect to the frame 31. The gap G of the space A is substantially equal to the thickness of the digitizer board 41.

When the digitizer board 41 is attached to the back surface of the frame 31, as shown in FIG. 3, side ends 41A of the digitizer board 41 in the width direction thereof (X direction) are held in the peripheral portion 16 of the bezel cover 13, in which the frame 31 is held. In other words, as shown in FIG. 3, the peripheral portion 16 protrudes backward from the back surface of the digitizer board 41 in the thickness direction thereof (Z direction), in the state where the liquid crystal panel 2, the backlight 21, the frame 31 and the digitizer board 41, stacked one on another, are attached to the bezel cover 13.

Thus, the peripheral portion 16 at both side portions 13A of the bezel cover 13 serves as positioning means for positioning the digitizer board 41 along the width direction thereof (X direction). This is because the height in the Z direction of the peripheral portion 16 at each side portion 13A of the bezel cover 13 is greater than the sum of the thicknesses of the liquid crystal panel 2, the backlight 21, the frame 31 and the digitizer 41.

Further, the digitizer board 41 has a rectangular flat board body 42. On both sides of the board body 42 in the width direction thereof (X direction), screw attachment portions 43, as ear-shaped projecting portions, protrude from the board body 42 along the main surface (the place defined by the X direction and the Y direction) of the board body 42. The screw attachment portions 43 are formed integral with a peripheral portion of the board body 42 of the digitizer board 41.

When the digitizer board 41 is held in the bezel cover 13, the screw attachment portions 43 are overlaid on the attachment portions 17 of the bezel cover 13. The screw attachment portions 43 serve as incorporating means for incorporating the digitizer board 41 into the bezel cover 13, and allow the digitizer 41 to be screwed to the bezel cover 13.

On one side of the board body 42, two screw attachment portions 43 are provided near both ends of the board body 42 along the height direction thereof (Y direction). On the other side of the board body 42, one screw attachment portion 43 is provided in a central portion of the board body 42 over a certain length along the height direction thereof (Y direction).

Each of the screw attachment portions 43 has a screw insertion hole 44 passing therethrough in the thickness direction. The screw insertion holes 44 respectively communicate with the screw holes 18 of the attachment portions 17 of the bezel cover 13, when the digitizer 41 is held inside the bezel cover 13. More specifically, each of the screw attachment portions 43 on one side of the board body 42 has one screw insertion hole 44. The screw attachment portion 43 on the other side of the board body 42 has two screw holes 44 at end portions along the longitudinal direction thereof (Y direction).

As shown in FIGS. 1 and 2, in the state where the liquid crystal panel 2, the backlight 21, the frame 31 and the digitizer board 41 are held inside the bezel cover 13 while the display screen area 3 of the liquid crystal panel 2 is exposed through the window portion 14 of the bezel cover 13, the driver circuit 7 is held in the frame 31 so as to face the back surface of the digitizer 41 by bending the flexible print circuit 6 toward the back surface of the digitizer 41.

The driver circuit 7 is separated from a back surface 2B of the liquid crystal panel 2, and arranged to face the liquid crystal panel 2 with the space A interposed therebetween. In this embodiment, the frame 31 is located between the driver circuit 7 and the liquid crystal panel 2. As described above, the space A is formed between the driver circuit 7 and the frame 31, more specifically, between a back surface 7B of the driver circuit 7 and the back surface 32B of the body 32. Since the gap G of the space A is substantially equal to the thickness of the digitizer board 41, the digitizer board 41 can be inserted between the back surface 7B of the driver circuit 7 and the back surface 32B of the body 32.

The digitizer board 41 is mounted between the body 32 of the frame 31 and the driver circuit 7. The driver circuit 7 is attached to face the back surface of the digitizer board 41 in a lower end portion along the height direction thereof (Y direction).

In this state, each of the flexible print circuits 6 is bent and held between each of the holding piece portions 37 of the frame 31.

Further, as shown in FIG. 1, a cable 50 is drawn from an upper end portion 32C of the frame 31. One end of the cable 50 is electrically connected to both ends of the cold cathode tube in the backlight 21. The other end of the cable 50 is connected to a housing 51 as a connector. The cold cathode tube of the backlight 21 is turned on by power supplied through the cable 50 via the housing 51.

An operation of the above embodiment will be described below.

First, in the liquid crystal display apparatus 1, electric power is supplied through the housing 51 and the cable 50 to the cold cathode tube, so that the cold cathode tube emits light. The light emitted from the cold cathode tube is incident on the light incidence surface of the light guide plate 22 directly or after being reflected by the inner surface of the lamp reflector covering the cold cathode tube.

The light incident on the light incidence surface of the light guide plate 22 is reflected toward the light emission surface of the light guide plate 22 by a prism (not shown) formed on the back surface of the light guide plate 22, or the reflection sheet 25 attached to the back surface of the light guide plate 22. The reflected light is emitted from the light emission surface of the light guide plate 22.

The emitted light is passed through the optical sheets 23 and 24. At this time, the emitted light is given by predetermined optical characteristics by the optical sheets 23 and 24. Thus, the luminance of the emission light can be increased and uniform.

The light passed through the optical sheets 23 and 24 is radiated on the display screen area 3 of the liquid crystal panel 2 via the polarizing plate 12.

The light incident on the display screen area 3 of the liquid crystal panel 2 is selectively passed through the liquid crystal panel 2 via the polarizing plate 11. As a result, the user can observe an image displayed on the display screen area 3 of the liquid crystal panel 2.

In the liquid crystal display apparatus 1, an input through the liquid crystal display panel 2 can be sensed in a state where an image is displayed in the display screen area 3. More specifically, when the user touches any position on the surface of the display screen area 3, the digitizer board 41 senses a change in static capacitance as coordinates. As a result, what position the user touches on the display screen area 3 is detected.

A first assembly operation of the above embodiment will be described.

First, the backlight 21 is fitted in the holding recess 33 of the frame 31, and thereafter, the liquid crystal panel 2 is fitted in the holding step portion 35 of the frame 31. In this state, the frame 31 holding the backlight 21 and the liquid crystal panel 2 is held in the bezel cover 13. Then, the engaging claw portion 36 of the frame 31 is engaged with the engaging groove 19 of the bezel cover 13.

At this time, the liquid crystal panel 2 is positioned so as to expose the display screen area 3 through the window portion 14 of the bezel cover 13. In addition, each of the flexible print circuits 6 connected to the liquid crystal panel 2 is held in the position between the holding piece portions 37 of the frame 31.

Then, the lower end 41B of the digitizer board 41 is inserted in the space A formed between the back surface 32B of the body 32 and the inner surface 37B of each holding piece portion 37 in the frame 31, and a surface 41C of the digitizer board 41 is overlaid on the back surface 32B of the body 32. The gap G of the space A is substantially the same as the thickness of the digitizer board 41. The lower end 41B of the digitizer board 41 inserted in the space A abuts on the lower end portion 32A of the body 32. Thus, the digitizer 41 is positioned and held in the space A.

At this time, the side ends 41A of the digitizer board 41 are positioned in the peripheral portion 16 of the bezel cover 13. In addition, the screw insertion holes 44 of the screw attachment portions 43 of the digitizer board 41 communicate with the screw holes 18 of the attachment portions 17 of the bezel cover 13. Thereafter, screw bodies (not shown) are inserted in the screw insertion holes 44 and the screw holes 18, which communicate each other. As a result, the screw attachment portions 43 of the digitizer board 41 are fixed to the attachment portions 17 of the bezel cover 13.

Further, each of the flexible print circuit 6 is bent toward a back surface 41D of the digitizer board 41, thereby causing the driver circuit 7 electrically connected to the liquid crystal panel 2 to face the back surface 41D of the digitizer board 41. At this time, the screw insertion holes 10 of the connection pieces 9 of the driver circuit 7 communicate with the screw holes 18 of the attachment portions 17 of the bezel cover 13. In this state, screw bodies (not shown) are inserted in the screw insertion holes 10 and the screw holes 18, which communicate each other. As a result, the connection pieces 9 of the driver circuit 7 are fixed to the attachment portions 17 of the bezel cover 13.

According to the first assembly operation described above, the space A is formed so that the digitizer board 41 can be disposed between the frame 31 and the driver circuit 7. Therefore, the digitizer board 41 can be reliable fixed to the frame 31 without a relatively complicated work of attaching the digitizer board 41 by means of caulking, adhesion with double-faced adhesive tapes, etc. In particular, since the frame 31 has the space A in which the digitizer board 41 can be inserted and disposed, the digitizer board 41 can be easily attached to the frame at any timing in the assembly operation.

A second assembly operation of the above embodiment will now be described.

First, as in the first assembly operation, the backlight 21 and the liquid panel 2 are held in the frame 31, the frame 31 is held in the bezel cover 13, and the engaging claw portions 36 of the frame 31 are engaged with the engaging groove 19 of the bezel cover 13.

Then, each of the flexible print circuits 6 is bent toward the back surface of the frame 31 and the driver circuit 7 is disposed to face the body 32, so as to make a space A between the driver circuit 7 and the back surface 32B of the body 32. The space A has the gap G. At this time, the back surface 7B of the driver circuit 7 is substantially parallel to the inner surface 37B of each holding piece portion 37. As a result, an opening AP, through which the digitizer circuit 41 can be inserted, is formed between the driver circuit 7 and the frame 31. The opening AP is formed in a position opposed to the structure where the lower end 41B of the digitizer board 41 engages with the frame 31. In this state, the screw insertion holes 10 of the connection pieces 9 of the driver circuit 7 communicate with the screw holes 18 of the attachment portions 17 of the bezel cover 13, the connection pieces 9 of the driver circuit 7 are fixed to the attachment portions 17 of the bezel cover 13 by means of a screw.

Then, the digitizer board 41 is slid through the opening AP and inserted into the space A formed between the back surface 32B of the body 32 and the back surface 7B of the driver circuit 7. The lower end 41B of the digitizer board 41 inserted through the opening AP is engaged with the holding piece portions 37 at the position corresponding to the opening AP, and the digitizer board 41 is overlaid to the back surface 32B of the body 32. As a result, the digitizer 41 is held in the space A.

At this time, the side ends 41A of the digitizer board 41 are positioned in the peripheral portion 16 of the bezel cover 13. In addition, the screw insertion holes 44 of the screw attachment portions 43 of the digitizer board 41 communicate with the screw holes 18 of the attachment portions 17 of the bezel cover 13. Then, the screw attachment portions 43 of the digitizer board 41 are fixed to the attachment portions 17 of the bezel cover 13 by means of screws.

According to the second assembly operation described above, the digitizer board 41 can be attached between the frame 31 and the driver circuit 7 simply by inserting the digitizer board 41 into the space A between the frame 31 and the driver circuit 7.

The space A, through which the digitizer board 41 can be inserted, has a first space formed between the body 32 of the frame 31 and the driver circuit 7 and a second space between the body 32 and the holding piece portion 37. The first space and the second space are arranged side by side in the direction in which the digitizer board 41 is inserted (Y direction). The spaces have the same gap G. Therefore, the digitizer board 41 can be held in a wider space along the direction of the insertion of the digitizer board 41 as compared to the first assembly operation. Accordingly, the digitizer board 41 can be attached to the back surface of the frame 31 more easily.

As described above, according to the embodiment of the present invention, the digitizer board 41 can be attached to the back surface of the frame 31 easily. Further, the frame 31 has, at its lower end portion, the holding piece portions 37, in which the lower end 41B of the digitizer board 41 is engaged and held. Therefore, the digitizer board 41 is positioned and fixed to the frame 31 by engaging the lower end of the digitizer board 41 inserted between the back surface of the frame 31 and the driver circuit 7 with the holding piece portions 37 of the frame 31.

Thus, when the digitizer board 41 is attached to the back surface of the frame 31, the digitizer board 41 can be positioned easily in the direction of the insertion of the digitizer board 41. In addition, the digitizer board 41 attached to the back surface of the frame 31 can be easily and reliably prevented from being deviated in the direction of the insertion of the digitizer board 41 (Y direction) with the simple structure.

Further, the peripheral portion 16 located at the side portions 13A at both ends of the bezel cover 13 protrudes from the back surface of the digitizer board 41 held in the bezel cover 13. Therefore, when the digitizer board 41 is held in the bezel cover 13, the side ends 41A of the digitizer board 41 abut on and held by the peripheral portion 16 in that portion.

Thus, when the digitizer board 41 is attached to the back surface of the frame 31, the digitizer board 41 can be positioned easily in the width direction thereof (X direction). In addition, the digitizer board 41 attached to the back surface of the frame 31 can be easily and reliably prevented from being deviated in the width direction perpendicular to the direction of the insertion of the digitizer board 41 (X direction) with the simple structure.

Furthermore, the attachment portions 17 are provided on both sides of the bezel cover 13, and a screw hole 18 is formed in each attachment portion 17. In addition, the screw attachment portions 43 are provided on both sides of the digitizer 41. The screw attachment portions 43 are overlaid on the attachment portions 17 of the bezel cover 13 when the digitizer board 41 is attached to face the back surface of the frame 31 held in the bezel cover 13. Each screw attachment portion 43 has the screw insertion hole 44, which communicate with the corresponding screw hole 18 of the bezel cover 13.

As a result, when the digitizer board 41 is attached to the back surface of the frame 31, each screw insertion hole 44 of the digitizer board 41 communicates with the corresponding screw hole 18 of the bezel cover 13, so that the digitizer 41 can be fixed to the back surface of the frame 31 by means of a screw.

Thus, the digitizer board 41 can be easily positioned and attached to the back surface of the frame 31, and reliably fixed thereto. Therefore, it is ensured that the digitizer board 41 is prevented from being deviated in the width direction (X direction) and the insertion direction of the digitizer board 41 (Y direction).

Moreover, the flexible print circuit 6 is bent toward the back surface of the frame 31 and the driver circuit 7 is faced to the back surface of the frame 31 in the state where the liquid crystal panel 2 is attached to the frame 31. In this state, the screw insertion holes 10 of the connection pieces 9 formed at both end portions of the driver circuit 7 respectively communicate with the screw holes 18 of the attachment portions 17 of the bezel cover 13 holding the frame 31.

Therefore, the driver circuit 7 can be fixed to the bezel cover 13 by screws inserted through the screw insertion holes 10 of the connection pieces 9 and the screw holes 18 of the bezel cover 13. Thus, the space A between the back surface 7B of the driver circuit 7 and the back surface 32B of the body 32 is ensured, so that the digitizer board 41 is sandwiched between and fixed by the driver circuit 7 and the frame 31. Since the digitizer board 41 is positioned and fixed to the back surface of the frame 31 in the thickness direction (Z direction), the digitizer board 41 can be held to the back surface of the frame 31 more reliably.

As described above, according to the present invention, the circuit board is spaced apart from to face the flat display panel with a space interposed between at least parts of them. Therefore, the sensor board can be inserted and disposed in the space between the flat display panel and the circuit board. Consequently, the sensor board can be attached to the panel easily.

In the above embodiment, the space A is formed between the frame 31 and the driver circuit 7 and the digitizer board 41 is inserted and disposed in the space A. However, the present invention is not limited to this structure. If the driver circuit 7 is spaced apart from the liquid crystal panel 2 so that the space A is formed in at least a part of the space between the liquid crystal panel 2 and the driver circuit 7, the same effects and advantages as those of the above embodiment can be obtained.

More specifically, the frame 31 need not be provided between the liquid crystal panel 2 and the driver circuit 7; that is, the space A having the gap G substantially the same as the thickness of the digitizer board 41 may be formed between the liquid crystal panel 2 and the driver circuit 7, or between the driver circuit 7 and the frame 31, which is located between the liquid crystal panel 2 and the driver circuit 7. Alternatively, the space A may be formed between the liquid crystal panel 2 and the frame 31, which is located between the liquid crystal panel 2 and the driver circuit 7.

In the above description, the liquid crystal display apparatus 1 having an optical modulation layer comprising a liquid crystal is described as an example of the flat-panel display apparatus. However, the present invention can be applied to a display apparatus, other than the liquid crystal display apparatus 1, for example, a flat-panel display apparatus having an organic EL panel.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flat-panel display apparatus comprising:
a flat display panel;
a backlight which is disposed at the back side of the flat display panel;
a frame which has a body portion which holds the backlight and the flat display panel, and a holding piece portion being provided on the back side of the body portion with a predetermined space between the holding piece portion and the body portion at one end of the frame;
a sensor board which is arranged between the back side of the body portion of the frame and the holding piece portion, and has screw attachment portions which protrude outwardly at predetermined positions, the sensor board allowing an input through the flat display panel;
a circuit board which is arranged on the side of the holding piece portion of the sensor board with the predetermined space and has connection pieces which protrude outwardly at the predetermined positions, the circuit board being configured to drive the flat display panel;
a bezel cover which is provided on the front side of the flat display panel so as to cover the flat display panel, the backlight, and the frame, in which the width of the bezel cover is greater than the dimensions of the flat display panel, the backlight, and the frame in the thickness direction, and the bezel cover has a peripheral portion which is formed on both side portions of the side corresponding to the holding piece portion, and attachment portions having screw insertion holes, which protrude outwardly at the predetermined positions and are orthogonal to the peripheral portion, wherein
one side of the sensor board is inserted in the holding piece portion of the frame with the space, and each of the screw attachment portions of the sensor board and the connection pieces of the circuit board is fixed to the screw insertion holes of the attachment portions of the bezel cover by means of screws.

2. A method of manufacturing a flat-panel display apparatus comprising:
supporting a flat display panel and a backlight which is disposed at the back side of the flat display panel by a body portion of a frame having a holding piece portion at one end of the frame;
arranging a circuit board, which has connection pieces which protrude outwardly at predetermined positions, for driving the flat display panel with a predetermined space to the back surface of the body portion;
engaging a bezel cover with the frame, in which the bezel cover having peripheral portions arranged on both sides covers the flat display panel, the backlight, and the frame, and the width of the bezel cover is greater than the dimensions of the flat display panel, the backlight, and the frame in the thickness direction, the bezel cover further having attachment portions including screw insertion holes, which protrude outwardly at the predetermined positions and are orthogonal to the peripheral portions;
placing both sides of a sensor board, which has screw attachment portions that protrude outwardly at the predetermined positions and allows an input through the flat display panel along the peripheral portions of the bezel cover, and inserting one side through the space, thereby engaging the sensor board with the holding piece portion of the frame; and
fixing each of the connection pieces of the circuit board and the screw attachment portions of the sensor board to the screw insertion holes of the attachment portions of the bezel cover by means for screws.

* * * * *